(12) United States Patent
Pukkella et al.

(10) Patent No.: US 11,173,458 B2
(45) Date of Patent: Nov. 16, 2021

(54) INTEGRATED APPARATUS FOR MIXING AND SEPARATING FLUID PHASES AND METHOD THEREFOR

(71) Applicant: Tata Consultancy Services Limited, Mumbai (IN)

(72) Inventors: Arjun Kumar Pukkella, Pune (IN); Sivakumar Subramanian, Pune (IN); Raviraju Vysyaraju, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 408 days.

(21) Appl. No.: 16/351,306

(22) Filed: Mar. 12, 2019

(65) Prior Publication Data
US 2019/0282976 A1 Sep. 19, 2019

(30) Foreign Application Priority Data
Mar. 14, 2018 (IN) .............................. 201821009412

(51) Int. Cl.
| *B01F 5/00* | (2006.01) |
| *B01F 5/06* | (2006.01) |
| *B01D 17/02* | (2006.01) |
| *B01D 19/00* | (2006.01) |
| *B01D 21/26* | (2006.01) |

(52) U.S. Cl.
CPC ........ *B01F 5/0647* (2013.01); *B01D 17/0217* (2013.01); *B01D 19/0057* (2013.01); *B01D 21/265* (2013.01); *B01F 5/0644* (2013.01)

(58) Field of Classification Search
CPC ............ B01F 5/0647; B01F 2215/0422; B01F 5/0602; B01F 5/0645; B01D 17/0217; B01D 17/04
See application file for complete search history.

(56) References Cited

U.S. PATENT DOCUMENTS

| 3,827,888 | A | * | 8/1974 | Terwilliger | ........... B01F 5/0615 430/616 |
| 3,860,217 | A | | 1/1975 | Grout | |
| 4,112,520 | A | | 9/1978 | Gilmore | |
| 4,545,901 | A | | 10/1985 | Schneider | |
| 2007/0263477 | A1 | | 11/2007 | Sudarsan et al. | |
| 2010/0320154 | A1 | * | 12/2010 | Ylikangas | .......... B01D 17/0217 210/704 |

\* cited by examiner

*Primary Examiner* — Anshu Bhatia
(74) *Attorney, Agent, or Firm* — Finnegan, Henderson, Farabow, Garrett & Dunner LLP

(57) ABSTRACT

This disclosure relates generally to mixing and separating phases of a mixture, and, more particularly, to an integrated apparatus for mixing and separating immiscible fluid phases and method therefor. The apparatus includes an inlet section, a mixing section, a separating section, and an outlet section. The mixing section includes multiple spiral turns for separately introducing the fluid phases of different specific gravity into the mixing section. Each of the spiral turns includes a helical channel followed by a counter-helical channel for enabling mixing of fluid phases. The counter-helical channel changes the direction of flow of fluid phases upon flow of said fluid phases from the helical channel to the counter-helical channel. The separating section extends from the mixing section separates the fluid phases based on specific gravity difference of fluid phases. The outlet section facilitates in separate withdrawal of fluid phases based on the specific gravity of said fluid phases.

14 Claims, 8 Drawing Sheets

INTEGRATED APPARATUS FOR MIXING AND SEPARATING FLUID PHASES AND METHOD THEREFOR

PRIORITY CLAIM

This U.S. patent application claims priority under 35 U.S.C. § 119 to: India Application No. 201821009412, filed on 14 Mar. 2018. The entire contents of the aforementioned application are incorporated herein by reference.

TECHNICAL FIELD

This disclosure relates generally to mixing and separating phases of a mixture, and, more particularly, to an integrated apparatus for mixing and separating immiscible fluid phases and method therefor.

BACKGROUND

Fluid phase mixing and separation plays an important role in industrial processes. Conventionally, various phase mixing and separation technologies are available. The conventional apparatus available for mixing and separation of multi-phase fluids includes separate units for carrying and processing said fluids. The operations in said units includes transferring said fluids with help of pumps, which accounts for increase in the total cost due to the costs associated with pumping. Moreover, such conventional apparatus includes rotating parts which are associated with higher operational costs and maintenance on mechanical parts. Additionally, the designs of conventional apparatus have lower contact stages.

SUMMARY

Embodiments of the present disclosure present technological improvements as solutions to one or more of the above-mentioned technical problems recognized by the inventors in conventional systems. For example, in one embodiment, an apparatus for mixing and separation of fluid phases is provided. The apparatus for mixing and separating fluid phases includes an inlet section, a mixing section, a separating section and an outlet section. The inlet section includes an inner inlet and an outer inlet for separately introducing the plurality of fluid phases of distinct specific gravity into the mixing section. The mixing section extends from the inlet section for mixing the plurality of fluid phases based on the difference of specific gravity and immiscibility associated the plurality of fluid phases. The mixing section includes a first spiral section comprising a first plurality of spiral turns, each spiral turn of the first plurality of spiral turns having a helical channel followed by a counter-helical channel for enabling mixing of the plurality of fluid phases, the counter-helical channel changes the direction of flow of the plurality of fluid phases upon flow of the plurality of fluid phases from the helical channel to the counter-helical channel. The separating section extending from the mixing section and capable of separating the plurality of fluid phases based on the specific gravity difference between said fluid phases, the separating section includes a second spiral section extending from the mixing section and configured to receive a mixture of the plurality of fluid phases from the mixing section, the second spiral section comprising a second plurality of spiral turns for enabling separation of the plurality of fluid phases. The outlet section configured at an end portion of the separating section, the outlet portion comprising an outer outlet and an inner outlet to facilitate separate withdrawal of the plurality of fluid phases of the mixture.

In another embodiment, a method for mixing and separating fluid phases is disclosed. The method includes introducing, in an apparatus for mixing and separating the fluid phases, a mixture comprising a plurality of fluid phases of distinct specific gravity. The apparatus includes fluid phases having an inlet section, a mixing section, a separating section and an outlet section. The inlet section includes an inner inlet and an outer inlet for separately introducing the plurality of fluid phases of distinct specific gravity into the mixing section. The mixing section extends from the inlet section for mixing the plurality of fluid phases based on the difference of specific gravity and immiscibility associated the plurality of fluid phases. The mixing section includes a first spiral section comprising a first plurality of spiral turns, each spiral turn of the first plurality of spiral turns having a helical channel followed by a counter-helical channel for enabling mixing of the plurality of fluid phases, the counter-helical channel changes the direction of flow of the plurality of fluid phases upon flow of the plurality of fluid phases from the helical channel to the counter-helical channel. The separating section extending from the mixing section and capable of separating the plurality of fluid phases based on the specific gravity difference between said fluid phases, the separating section includes a second spiral section extending from the mixing section and configured to receive a mixture of the plurality of fluid phases from the mixing section, the second spiral section comprising a second plurality of spiral turns for enabling separation of the plurality of fluid phases. The outlet section configured at an end portion of the separating section, the outlet portion comprising an outer outlet and an inner outlet to facilitate separate withdrawal of the plurality of fluid phases of the mixture. Further, the method includes withdrawing separately, from the outlet section, the plurality of fluid phases based on the specific gravity of the plurality of fluid phases.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1A:
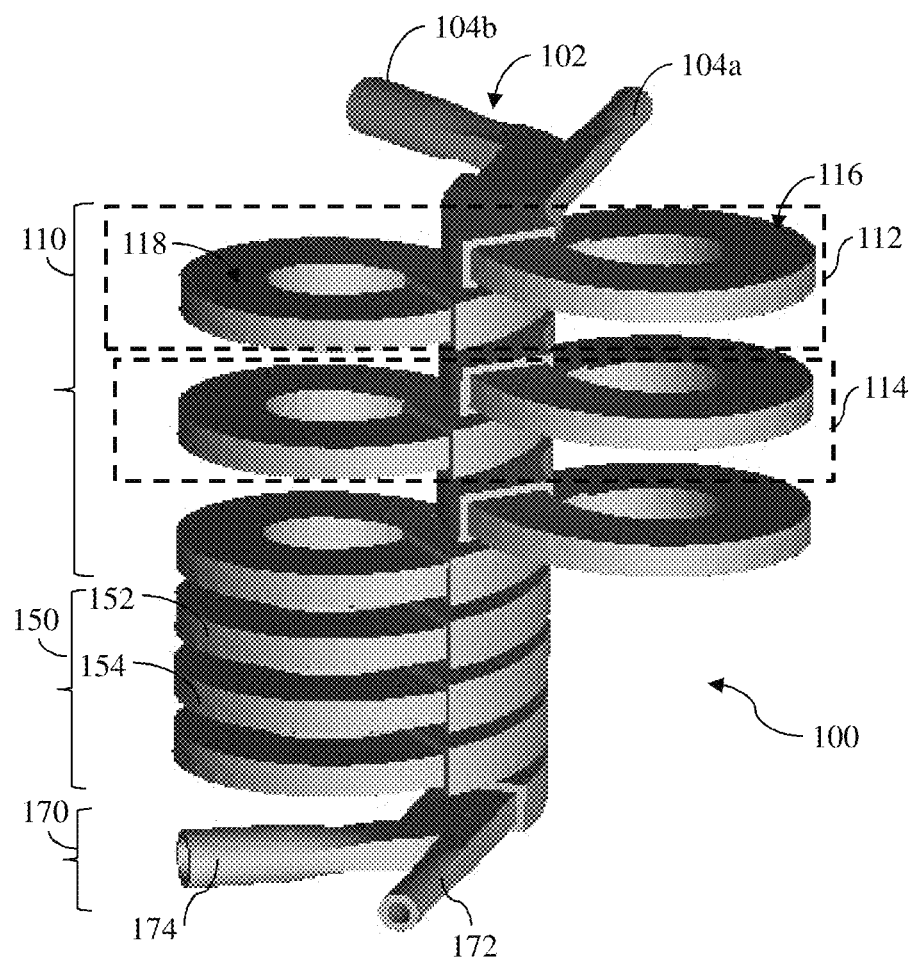
FIGS. 1A and 1B illustrate an isometric view and top view of an apparatus for mixing and separating fluid phases, in accordance with an example embodiment.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Typically, in industrial applications, huge amounts of multiphase mixtures are to be treated by way of mixing for variety of reasons, including, but not limited to, liquid-liquid extraction, reaction, and so on. Said multiphase mixtures are later separated into streams that are selectively beneficiated to achieve a desired separation. Herein, the term 'phase' refers to various materials or ingredients of a mixture, for instance, those which differ in density and/or size (for example, in case of solid particles). Accordingly, the terms 'ingredients', 'materials' and 'phases' shall be used interchangeably throughout the description.

The mixing and separation of said phases associated with a mixture is utmost important in industrial processes. Generally, mixing and separation of ingredients or phases from mixtures, such as solid-liquid mixture, gas-liquid or liquid-liquid mixture, are considered as two different operations and are achieved by various conventional techniques. Liquid-Liquid mixing are desirable industrial operations to carry out unit operations like extraction, reactions, and so on. Said operations require higher dispersion of fluid phases for better mixing to ensure greater contact among the phases.

Conventionally, said operations are carried out in stirring vessels, where two immiscible liquid streams are brought into contact and stirred in a vessel with the help of mechanical agitation. Alternatively, inline mixers and/or static mixers may be utilized for carrying out the mixing operation. These inline mixers are the straight channels with internal packing elements which separates the liquid stream in to layers and mixes with one another until the desired level of mixing is reached. Another alternative arrangement includes packed beds with packing where the fluids are brought in contact either concurrently or in a counter-current fashion.

Once the desired mixing is achieved (after the system reach sufficiently close to the phase equilibrium conditions), the challenge is to separate the two fluid streams from one another. Typically, for separation operation, techniques such as industrially gravitational and centrifugal decantation are employed. Decantation is a technique of separation liquid streams based on their differences in density. Gravitational decantation takes longer processing times, to accelerate this separation industrially centrifugal decantation is employed and this operation (Centrifugal decantation) consumes higher energy.

In order to perform the separation operation subsequent to the mixing operation, the processing fluid has to be transferred with help of pumps, which accounts for increase in the total cost because of the pumping costs. Another type of conventionally apparatus includes centrifugal extractors that works on the principle of centrifugal force. In such apparatus, centrifugal force is generated due to motion of high speed rotating chamber which propels the heavy liquid to the outer periphery. During this process, the mixing between the phases occurs but achieving these high speeds requires higher operational costs and maintenance on mechanical parts. Moreover, these designs also have lower contact stages. In addition, most of the conventionally available apparatus which can achieve both mixing and separation includes movable parts, thereby resulting wear and tear and high operational and maintenance cost.

Various embodiments disclosed herein provide an apparatus for fluid-phase mixing and separation in a manner that overcomes limitations of existing methods and apparatus used for mixing and separation of fluid phases such as liquid-gas phases, liquid-liquid phases, and so on. Herein, the fluid phases may heterogeneous or homogeneous streams that may be mixed and separated as per the requirements. The disclosed apparatus is an integrated apparatus that combines mixing and separation of the plurality of phases. The disclosed apparatus comprises a compact intensified design or equipment which can accomplish both mixing and separation without any moving parts. The apparatus embodies a modular design which can be arranged in to series and/or parallel configuration to improve the recovery and purity of the yield, as desired. The apparatus does not require an external pumping arrangement between mixing and separation spiral sections.

In an embodiment, the disclosed apparatus includes a mixing section followed by a separating section. The purpose of the mixing section is to allow thorough mixing of the phases while the separating section allows for separation of the phases so that impurities previously present in one phase can be separated out therefrom upon being mixed with another phase. The mixing section includes multiple spiral turns such that each spiral turn includes a helical channel followed by a counter-helical channel. The helical channels and the counter helical channels may include counter baffles or packings to promote extensive enhanced mixing. The separating section includes a series of spiral turns that utilizes induced centrifugal force acting on the phases for separation of the phases. The separated phases can be obtained from the outlet of the separating section. In an arrangement, said outlet may include an adjustable splitter for effective separation of phases.

While aspects of described apparatus and method for mixing and separation can be implemented in any number of different systems, utility environments, and/or configurations, the embodiments are described in the context of the following exemplary apparatuses.

Figure 1B:
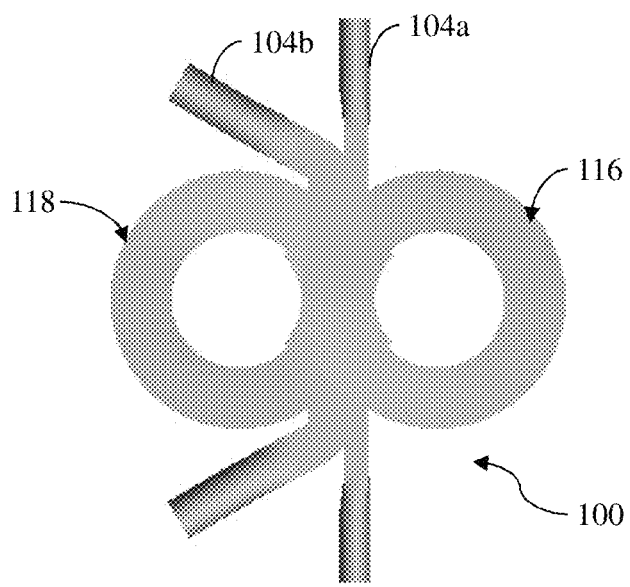

FIGS. 1A and 1B illustrate various views of an apparatus 100 for mixing and separating fluid phases, in accordance with an example embodiment. For example, FIG. 1A illustrate a isometric view of the apparatus 100; and FIG. 1B illustrate a top view of the apparatus 100.

Referring collectively to FIGS. 1A-1B, the apparatus 100 includes an inlet section 102, a mixing section 110, a separating section 150, and an outlet section 170.

The inlet section 102 is configured to separately introduce the plurality of immiscible fluid phases of distinct specific gravity into the mixing section 110. The inlet section 102 includes an inner inlet and an outer inlet for separately introducing said fluid phases. In an embodiment, the inlet section 102 further includes an inlet connector for coupling the inner inlet and the outer inlet to the mixing section. An example inlet section 102 is described further in detail with reference to FIG. 2.

Figure 2:
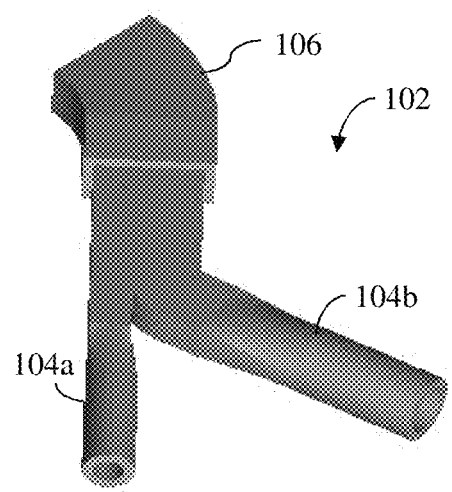
FIG. 2 illustrates an example inlet section of the apparatus of FIGS. 1A and 1B, in accordance with an example embodiment.

Referring to FIG. 2, the inlet section 102 is shown to include an inner inlet 104a and an outer inlet 104b. The inner inlet 104a facilitates in introducing a fluid phase associated with relatively higher specific gravity from amongst the plurality of fluid phases in the inlet section. The outer inlet 104b facilitates in introducing a fluid phase associated with relatively lower specific gravity from amongst the plurality of fluid phases in the inlet portion 102. In an embodiment, the inlet section 102 may include an inlet connector 106 for coupling the inner inlet 104a and the outer inlet 104b to the mixing section 110.

Referring back to FIGS. 1A and 1B, the mixing section 110 extends from the inlet section 102. The mixing section 110 is configured to receive and mix the plurality of fluid phases based on difference of specific gravity and immiscibility associated the plurality of fluid phases. The mixing section 110 is configured as a first spiral section extending from the inlet section 102. The first spiral section includes a first plurality of spiral turns. Each spiral turn of the first plurality of spiral turns includes a helical channel followed by a counter-helical channel for enabling mixing of the plurality of fluid phases. In each of the spiral turn, the counter-helical channel changes the direction of flow of the plurality of fluid phases upon flow of the plurality of fluid phases from the helical channel to the counter-helical channel. An example configuration of the mixing section is described further in detail with reference to FIG. 3A.

Figure 3A:
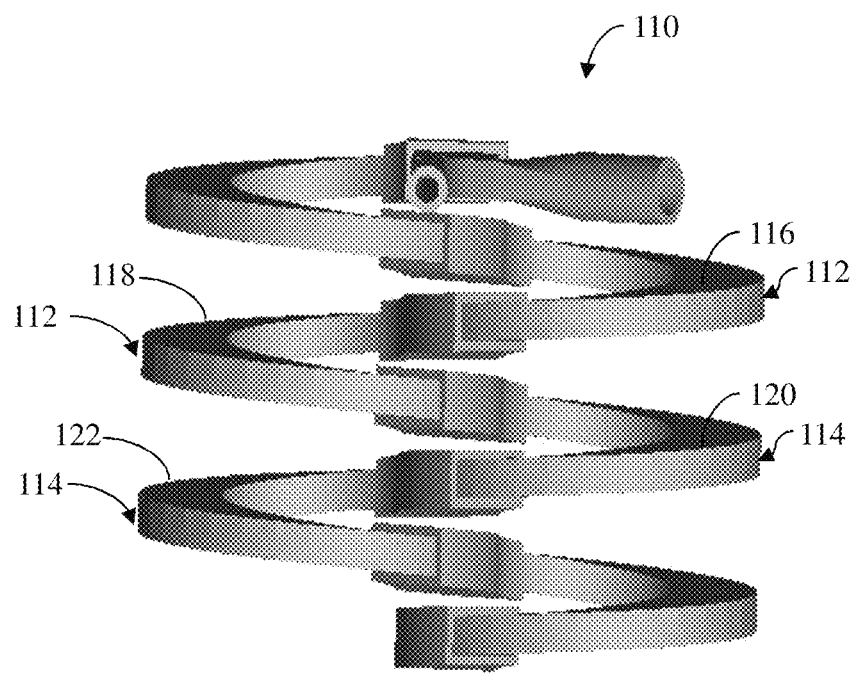
FIG. 3A illustrates an example mixing section of the apparatus of FIGS. 1A and 1B, in accordance with an example embodiment.

Referring to FIG. 3A, the mixing section 110 is illustrated. The mixing section 110 is shown to include the first plurality of spiral turns such as spiral turns 112, 114. Each of the spiral turns 112, 114 include a helical channel followed by a counter-helical channel. For example, the spiral turn 112 includes a helical channel 116 followed by a counter-helical channel 118. Similarly, the spiral turn 114 includes a helical channel 120 followed by a counter-helical channel 122. The counter-helical channel changes the direction of flow of the plurality of fluid phases (i.e. clock-wise to counter clock wise and vice-versa) upon flow of the plurality of fluid phases from the helical channel to the counter-helical channel. Herein, an important contribution of the disclosed embodiments is configuration of the spiral turns of the mixing section in the aforementioned manner, i.e. a helical turn followed by a counter-helical turn, thereby enabling enhanced mixing of the fluid phases.

As illustrated in FIG. 3A, the first plurality of spiral turns are designed in such a way that after one full turn of the helical channel, the direction of the turn is mirrored in opposite direction, i.e. in the counter-helical channel. Hence, an outer periphery wall on the antecedent (helical) channel becomes an inner periphery wall of the counter-helical channel. For example, the helical channel 116 includes an outer wall 116a and an inner wall 116b that are opposite to each other. The walls or opposing sides 116a, 116b of the helical channel 116 are mirrored in opposite direction in the counter-helical channel 118. For example, the opposite walls 116a, 116b of the helical channel 116 are turned relative to one another in opposite directions and thus form walls 118b, 118a, respectively of the counter-helical channel 118.

In an embodiment, the mixing section embodies a modular design, meaning thereby that the mixing section can be configured and/or dismantled by assembling and/or un-assembling, respectively multiple spiral turns. For example, the spiral turns such as spiral turns 112, 114 of the mixing section 110 can be assembled to form the mixing section. Also, each of the helical channels and counter-helical channels of the spiral turns can be assembled and un-assembled to configure and dismantle, respectively the corresponding spiral turn. For example, the helical channel 116 and the counter-helical channel 118 of the spiral turn 112 can be decoupled from each other to dismantle the spiral turn 112. Similarly, the helical channel 116 and the counter-helical channel 118 of the spiral turn 112 can be coupled to each other to configure the spiral turn 112.

In an embodiment, the assembling and/or un-assembling of the spiral turns and/or the mixing section is facilitated by a plurality of first couplings. Each of the plurality of first coupling facilitates in coupling components of the mixing section 110. For example, a first coupling 132 facilitates in coupling the helical channel 116 and the counter-helical channel 118. Similarly, a first coupling 134 facilitates in coupling helical channel 120 and the counter-helical channel 122. An example of the first coupling is illustrated with reference to FIG. 3B.

Figure 3B:
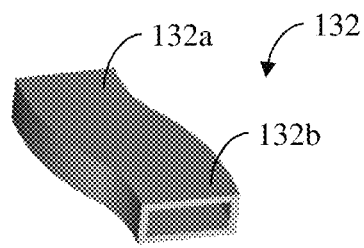
FIG. 3B illustrates an example inlet connector and/or first connector, of the apparatus of FIGS. 1A and 1B, in accordance with an example embodiment.

Referring now to FIG. 3B, the first coupling 132 includes a hollow S-shaped configuration having a first end portion 132a and a second end portion 132b. The first end portion 132a and the second end portion 132b in configured to accommodate an incoming helical channel and the second end portion is configured to accommodate an outgoing counter-helical channel, thereby coupling the helical channel with the counter-helical channel and hence configuring the spiral turn.

In an embodiment, the mixing section 110 includes a plurality of baffles configured within one or more of the helical channel and counter-helical channel of the first plurality of spiral turns for enhanced mixing of the plurality of fluid phases. Additionally or alternatively, the mixing section 110 may include packing material configured within the first plurality of spiral turns for enhanced mixing of the plurality of fluid phases. The packing material may be within the size range of (0.5 mm-2 mm), These are made up of organic polymer substrates, and may be in the form of spheres called microbeads. Microbeads have high specific area and these will enhance in mixing of the fluids in counter-spiral. These materials are flexible.

Herein, the packing material and/or the baffles increase the contact area between the phases. In an embodiment, the number of baffles and/or the distance between the baffles depends upon the properties, such as density, viscosity of the fluid phases in contact. The configuration of the baffles in the spiral turns and/or counter-helical turns is described further in detail with reference to FIGS. 4A and 4B.

Figure 4A:
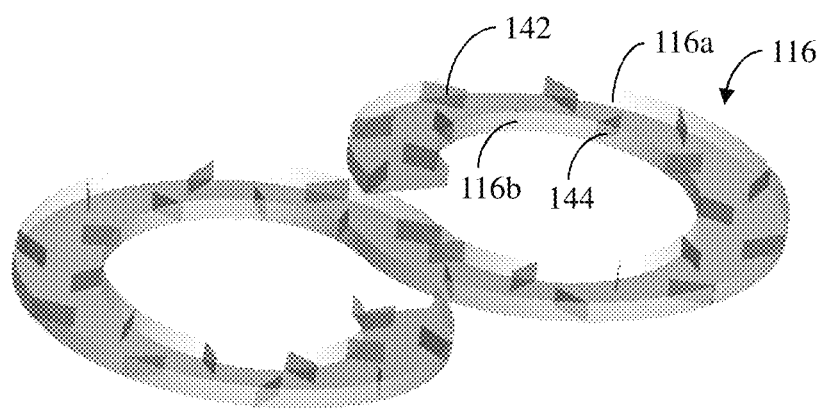
FIGS. 4A-4B illustrates example baffle arrangements embodied in the apparatus of FIGS. 1A and 1B, in accordance with an example embodiment.
Figure 4B:
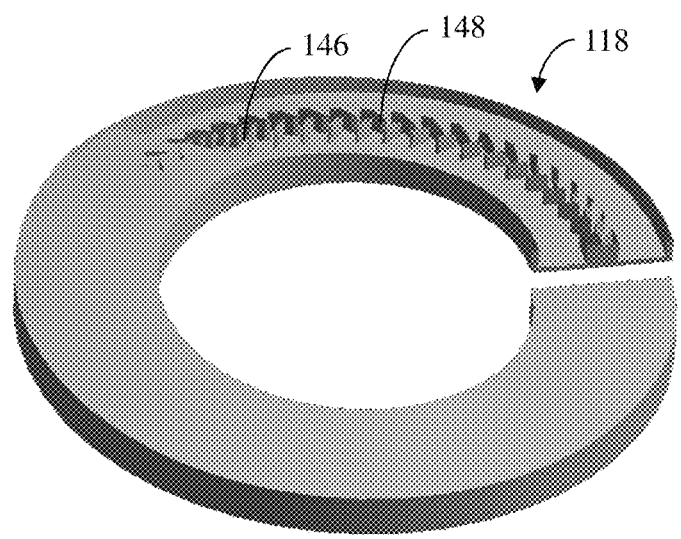

Referring to FIGS. 4A-4B, a channel for example, the helical channel 116 of the mixing section 110 of the apparatus 100 is shown to include a plurality of baffles configured within the helical channel. Herein, for the sake of brevity of description, only a channel of a spiral turn is shown. However, it will be understood that in alternate embodiments and implementations of the apparatus 100, the plurality of baffles may be configured on fewer or more number of channels and/or counter-channels and/or spiral turns. In an example embodiment, said baffles and/or packings may be configured at an outer periphery wall 116a and inner periphery wall 116b of the helical channel 116. For example, baffles 142, 144 are shown to be configured at the walls 116a, 116b respectively, of the helical turn 116 (refer FIG. 4A). Additionally or alternatively, said plurality of baffles 146, 148 are configured near the core of the counter-helical channel 118 (refer FIG. 4B). Herein, the baffles may be configured near the core of the helical and/or counter-helical channel by affixing the said baffles at a top and bottom wall of said channel. Said baffles promote extensive mixing of the fluid phases.

Once the fluid phases are mixed in the mixing section 110, the mixture of the fluid phases is allowed to pass through the separating section 150. The separating section 150 is described in further detail with reference to FIGS. 1A, 1B and 5A.

Figure 5A:
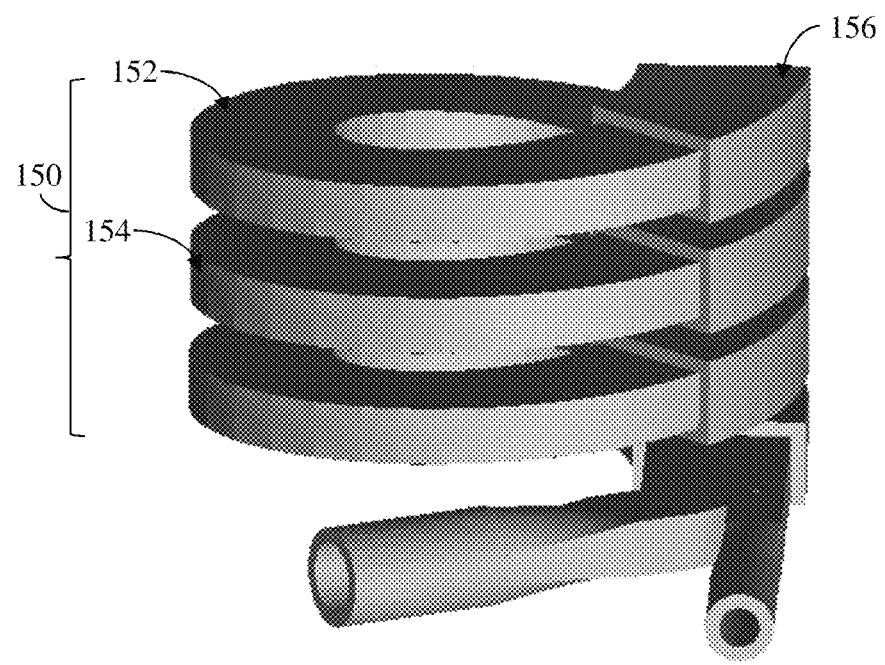
FIG. 5A illustrates an example separating section of the apparatus of FIGS. 1A and 1B, in accordance with an example embodiment.

Referring collectively to FIGS. 1A, 1B and 5A, the separating section 150 extends from the mixing section 110 and is capable of separating the plurality of fluid phases based on the specific gravity difference between said fluid phases. The separating section 150 is configured to receive the mixture of the plurality of fluid phases from the mixing section 110. The separating section 150 includes a second spiral section having a second plurality of spiral turns such as spiral turns 152, 154 extending from the mixing section 110. The second plurality of spiral turns 152, 154 enables separation of the fluid phases. The separating section 150 is described further in detail with reference to FIG. 5A. The separation of the fluid phases in the separating section 150 is achieved because of induced centrifugal acting on the fluid phases due to the curved spiral path. As the mixture of the fluid phases pass through the separating section 150, the heavier fluid phase separates out and moves towards the outer periphery wall, and thus is separated at the outlet.

In an embodiment, each spiral turn of the second plurality of second turns is coupled to subsequent spiral turn by a second coupling. For example, referring to FIG. 5A, the spiral turn 152 is couple to the spiral turn 154 by means of a second coupling such as a second coupling 156. The second couplings allows assembling and/or un-assembling of the second plurality of spiral turns of the separating section. Hence, the mixing section assumes a modular configuration thereby enabling the portability of the apparatus 100. Moreover, such modular configuration allows for adjusting the number of turns in the apparatus as per the requirement and/or application. An example of the first coupling is illustrated with reference to FIG. 5B.

Figure 5B:
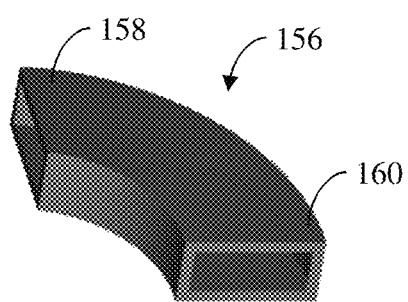
FIG. 5B illustrates a second coupling of the separating section of FIG. 5A, in accordance with an example embodiment.

Referring now to FIG. 5B, the second coupling 156 includes a hollow arc-shaped configuration having a first end portion 158 and a second end portion 160. The first end portion 158 and the second end portion 160 are configured to accommodate an incoming spiral channel and the second end portion is configured to accommodate an outgoing spiral channel, thereby coupling the helical channel with the counter-helical channel and hence configuring the spiral turn.

Referring back to FIGS. 1A and 1B, the apparatus 100 includes the outlet section 170 configured at an end portion of the separating section. The outlet section 170 includes an outer outlet 172 and an inner outlet 174 to facilitate separate withdrawal of the plurality of fluid phases of the mixture. The inner outlet 174 facilitates in withdrawal of a fluid phase associated with relatively higher specific gravity from amongst the plurality of fluid phases in the outlet section 170. The outer outlet 172 facilitates in withdrawal of a fluid phase associated with relatively lower specific gravity from amongst the plurality of fluid phases. In an embodiment, the outlet section 170 includes an outlet connector, for example, an outlet connector 176 for coupling the separating section to the outer outlet 172 and the inner outlet inlet 174.

In an embodiment, the outlet section 170 includes a splitter that is movably configured in proximity to the outlet connector 176, and facilitates in adjusting the volume of fluid phases to be separated for withdrawal. The splitter is shown and described in detail with reference to FIG. 6.

Figure 6:
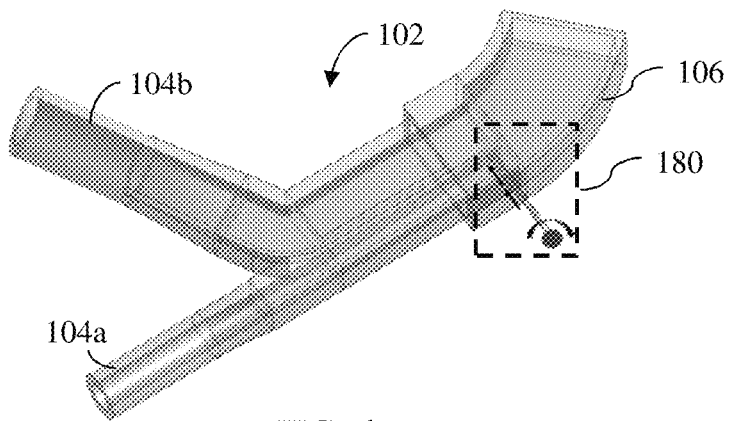
FIG. 6 illustrates an example outlet section having an adjustable splitter for the FIGS. 1A and 1B, in accordance with an example embodiment.

Referring now to FIG. 6, the outlet section 170 of the apparatus 100 is illustrated. The outlet section 170 is shown to include a splitter 180. The splitter facilities in adjusting the volume of fluid phases to be separated for withdrawal. In an embodiment, the position of the splitter 180 is dependent on the volumetric flow rates, viscosity and density of the phases. In an embodiment, the position of the splitter within the outlet section can be adjusted by means of a screw mechanism. For example, as illustrated in FIG. 6, the splitter 170 can be adjustably moved towards one of the inner outlet and the outer outlet by operation of the screw mechanism 182. Herein, it will be understood that the screw mechanism is a known screw mechanism and hence for the brevity of description, it is not explained herein in detail. It will also be understood that the position of the splitter 180 can be adjusted by means of any similar mechanism know in art, without limiting to the screw mechanism. The mechanism for operation of the apparatus 100 is explained below.

Figure 7:
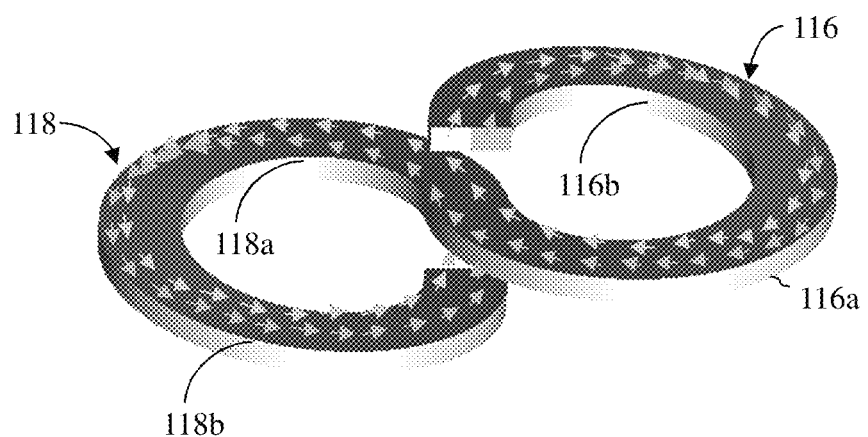
FIG. 7 illustrates phase distribution of a mixture of a plurality of fluid phases in a counter-helical section of the apparatus of FIGS. 1A and 1B, in accordance with an example embodiment.

The apparatus 100 utilizes specific gravity difference between the plurality of immiscible fluid phases to achieve both mixing and separation of the fluid phases. The process of mixing of the plurality of immiscible fluid is illustrated with reference to FIG. 7. For the sake of brevity of description and ease of understanding, FIG. 7 is shown to include a spiral turn of the first plurality of spiral turn without illustrating remaining components of the mixing section such as connectors. Referring now to FIG. 7, a relatively heavier fluid phase (from amongst the plurality of fluid phases) is introduced near an inner side 116ba of the inlet channel 116 whereas the lighter fluid phase is introduced at an outer side 116a of the inlet channel 116 for mixing. When the fluid streams or phases are passed to travel through the helical channel 116, induced centrifugal force because of the curved channel acts on the fluid streams/phases. But the heavier fluid phase experience greater force (as the induced centrifugal force is directly proportional to the mass or density) and hence tries to reach the outer periphery of the helical channel 116 by crossing the lighter fluid phase.

By the aforementioned mechanism, the apparatus 100 is capable of providing more contact stages between the heavier and lighter fluid phases resulting in improved micromixing of said phases since the heavier fluid phase reaches the outer periphery in the prior turn is now at the inner periphery wall in the counter helical turn. Hence, again a new competition is set up for the heavier fluid phase to reach the outer periphery in the current turn. In an embodiment, the said pairs of counter helical turns may be repeated until the desired mixing level between the phases is reached.

In an embodiment, one or more of the first spiral section and the second spiral section may be configured from of materials such as Polydimethylsiloxane (PDMS), Cross-linked Polyethylene (PEX), and other similar material. In micro scale, mixing is dominated by diffusion because of small length scales. In that case, walls of the first spiral section and the second spiral section may be made up of soft materials that may help in promoting mixing because of the flow instabilities which arise from the fluid and soft wall interactions. Thus, along with the induced centrifugal forces, this instability also helps in enhancing the mixing operation. An example method for mixing and separating fluid phases is described further with reference to FIG. 8.

Figure 8:
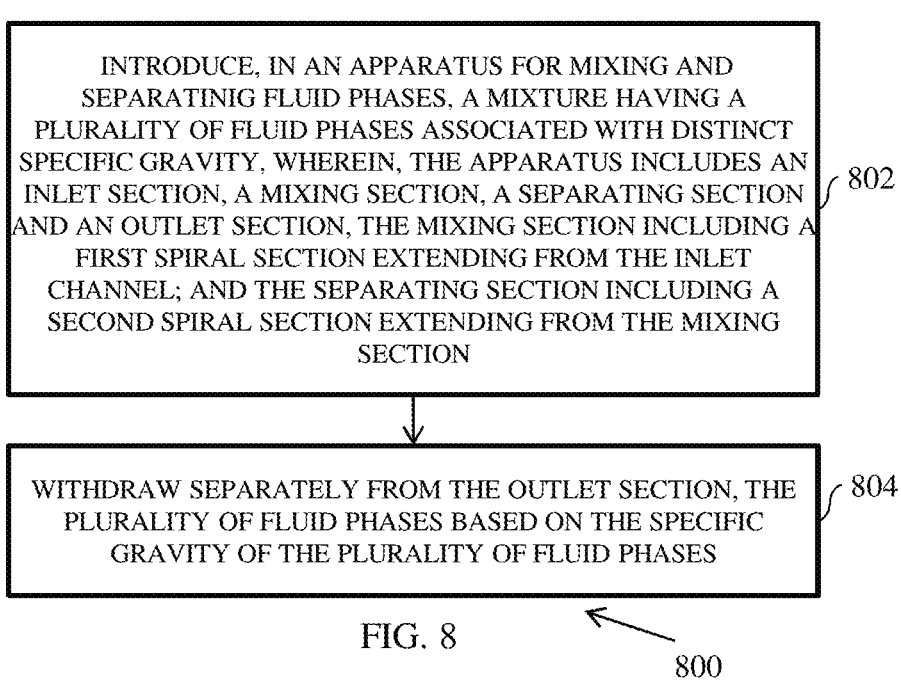
FIG. 8 illustrates a flow-diagram of a method for mixing and separating fluid phases, in accordance with an example embodiment.

FIG. 8 illustrates a flow-diagram of a method 800 for mixing and separation of fluid phases, in accordance with an example embodiment. At 802, the method 800 includes introducing, in a phase mixing and separating apparatus, a mixture comprising a plurality of fluid phases associated with distinct specific gravity. Herein, the phase mixing and separating apparatus may be the apparatus 100 described with reference to FIGS. 1A-5B. The aforementioned apparatus 100 and its components have been described in detail with reference to FIGS. 1A-7, and hence for the brevity of description a detailed description thereof is precluded.

Upon introducing the mixture in the apparatus, the fluid phases of the mixture experiences centrifugal force. However, due to a difference of the specific gravity of the fluid phases of the mixture, the centrifugal force experienced by distinct phases is different. For example, the phases having higher specific gravity, experiences more centrifugal force than the phases of relatively lower effective mass.

At 804, the method 800 includes withdrawing separately, from the outlet section of the apparatus, the plurality of fluid phases of the separating section based on a specific gravity said plurality of fluid phases. In an embodiment, withdrawing separately the one or more phases may include withdrawing a phase associated with a relatively lower specific gravity from an outlet configured at an outer wall of the one or more walls of the second plurality of spiral turns. Additionally or alternatively, a phase of the specific gravity can be withdrawn from a split outlet configured at an inner wall of the one or more walls of the second plurality of spiral turns.

Figure 9A:
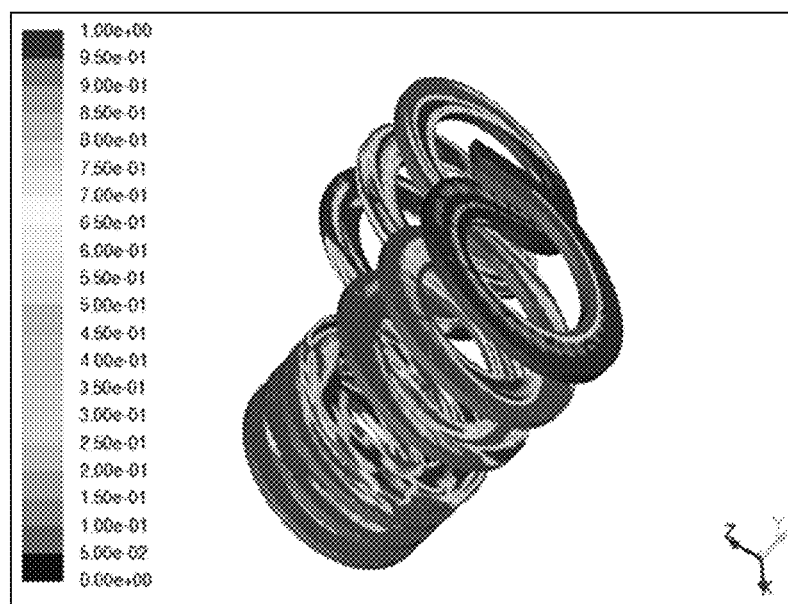
FIGS. 9A-9B illustrates volume fraction contours of a plurality of fluid phases in various sections of the apparatus of FIGS. 1A and 1B, in accordance with example embodiment.
Figure 9B:
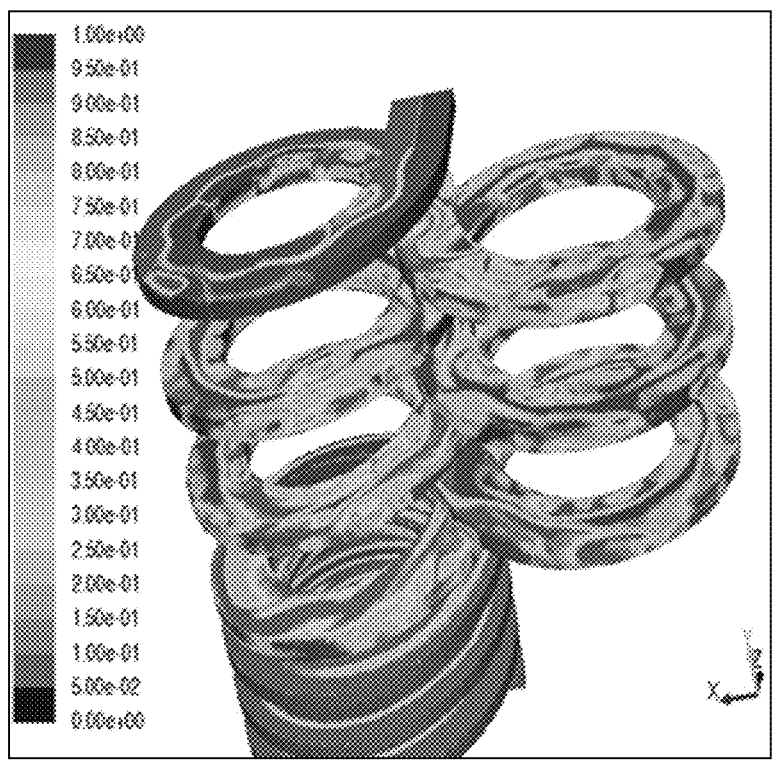

FIGS. 9A and 9B illustrate contours of volume fraction obtained for the disclosed apparatus of FIGS. 1A-8. Referring to FIG. 9A, in an experimental setup water and chloroform were passed through inlet section of the apparatus. Herein, chloroform was passed through the inner inlet where as waster was passed through the outer inlet. As these fluids are passed through counter helical channel, the fluid are mixed. Said fluids are separated in the separating section of the apparatus. As the fluid are induced by centrifugal force, heavier fluid moves towards wall, and lighter fluid moves away from the wall.

Referring now to FIG. 9B, the experimental results are obtained upon incorporating baffles in the counter helical channels of the apparatus. Said baffles induced enhanced mixing by splitting into fluid elements. An increased mixing is observed in the volume fractions contour shown in counter helical channel of the apparatus in FIG. 9B.

Various embodiments provide an integrated phase mixing and separation apparatus that is devoid of any moving parts. The disclosed apparatus embodies a modular design which can be arranged in to series and/or parallel configuration to improve the recovery and purity of the yield, as desired. The apparatus does not require an external pumping arrangement between mixing and separation spiral sections, and is therefore cost effective. The apparatus utilizes specific gravity difference between the two immiscible liquids to achieve both mixing and separation of the phases.

Additionally, the apparatus facilitates in separate withdrawal of phases of the mixture by means of different outlets configured at different widths of the cross section of the second plurality of spiral turns. For example, in an embodiment, the apparatus includes a splitter which slides past the cross section of the spiral turns of the separating section, which gives separate streams of outer outlet and inner outlet. It will be noted herein, that in different applications, the mixture can include more than two phases, and the apparatus may be caused to facilitate separate withdrawal of said phases by means of different outlets configured at different widths of the cross section of the turns. The different widths may be determined based on the specific gravity of the phases of the mixture. It will also be understood that the amount of phases withdrawn can be different (and not necessarily equal).

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. An apparatus for mixing and separating fluid phases by introducing a mixture comprising a plurality of fluid phases of distinct specific gravity, comprising:
   an inlet section comprising an inner inlet and an outer inlet for separately introducing the plurality of fluid phases of distinct specific gravity into the mixing section;
   a mixing section extending from the inlet section for mixing the plurality of fluid phases based on the difference of specific gravity and immiscibility associated the plurality of fluid phases, the mixing section comprising a first spiral section comprising a first plurality of spiral turns, each spiral turn of the first plurality of spiral turns having a helical channel followed by a counter-helical channel for enabling mixing of the plurality of fluid phases, the counter-helical channel changes the direction of flow of the plurality of fluid phases upon flow of the plurality of fluid phases from the helical channel to the counter-helical channel;

a separating section extending from the mixing section and capable of separating the plurality of fluid phases based on the specific gravity difference between said fluid phases, the separating section comprising a second spiral section extending from the mixing section and configured to receive a mixture of the plurality of fluid phases from the mixing section, the second spiral section comprising a second plurality of spiral turns for enabling separation of the plurality of fluid phases; and an outlet section configured at an end portion of the separating section, the outlet portion comprising an outer outlet and an inner outlet to facilitate separate withdrawal of the plurality of fluid phases of the mixture.

2. The apparatus of claim 1, wherein an inner wall of the helical channel extends to form an outer wall of the counter-helical channel, and an outer wall of the helical channel extends to form an inner wall of the counter-helical channel.

3. The apparatus of claim 1, wherein the mixing section comprises a plurality of baffles configured within one or more of the helical channel and the counter-helical channel of the first plurality of spiral turns for enhanced mixing of the plurality of fluid phases.

4. The apparatus of claim 1, wherein the mixing section comprises a plurality of baffles configured at a core of the one or more of the helical channels and the counter-helical channels.

5. The apparatus of claim 1, wherein the inner inlet facilitates in introducing a fluid phase associated with relatively higher specific gravity from amongst the plurality of fluid phases in the inlet section, and the outer inlet facilitates in introducing a fluid phase associated with relatively lower specific gravity from amongst the plurality of fluid phases in the inlet section.

6. The apparatus of claim 1, wherein the inlet section further comprises an inlet connector for coupling the inner inlet and the outer inlet to the mixing section.

7. The apparatus of claim 1, wherein each helical channel is coupled to the corresponding counter-helical channel by a first coupling.

8. The apparatus of claim 1, wherein each spiral turn of the second plurality of second turns is coupled to a subsequent spiral turn by a second coupling.

9. The apparatus of claim 1, wherein the outlet section further comprises an outlet connector for coupling the separating section to the outer outlet and the inner outlet inlet.

10. The apparatus of claim 1, wherein the inner outlet facilitates in withdrawal of a fluid phase associated with relatively higher specific gravity from amongst the plurality of fluid phases, and the outer outlet facilitates in withdrawal of a fluid phase associated with relatively lower specific gravity from amongst the plurality of fluid phases.

11. A method for mixing and separating fluid phases, the method comprising:

introducing, in an apparatus for mixing and separating the fluid phases, a mixture comprising a plurality of fluid phases of distinct specific gravity, the apparatus comprising:

an inlet section comprising an inner inlet and an outer inlet for separately introducing the plurality of fluid phases of distinct specific gravity into a mixing section, the mixing section extending from the inlet section for mixing the plurality of fluid phases based on the difference of specific gravity and immiscibility associated the plurality of fluid phases, the mixing section comprising a first spiral section comprising a first plurality of spiral turns, each spiral turn of the first plurality of spiral turns having a helical channel followed by a counter-helical channel for enabling mixing of the plurality of fluid phases, the counter-helical channel changes the direction of flow of the plurality of fluid phases upon flow of the plurality of fluid phases from the helical channel to the counter-helical channel, a separating section extending from the mixing section and capable of separating the plurality of fluid phases based on the specific gravity difference between said fluid phases, the separating section comprising a second spiral section extending from the mixing section and configured to receive a mixture of the plurality of fluid phases from the mixing section, the second spiral section comprising a second plurality of spiral turns for enabling separation of the plurality of fluid phases, and an outlet section configured at an end portion of the separating section, the outlet section comprising an outer outlet and an inner outlet to facilitate separate withdrawal of the plurality of fluid phases of the mixture; and withdrawing separately, from the outlet section, the plurality of fluid phases based on the specific gravity of the plurality of fluid phases.

12. The method of claim 11, wherein introducing the plurality of fluid phases comprises introducing a fluid phase associated with relatively higher specific gravity from amongst the plurality of fluid phases in the inner inlet, and introducing a fluid phase associated with relatively lower specific gravity from amongst the plurality of fluid phases in the outer inlet.

13. The method of claim 11, wherein withdrawing separately the plurality of fluid phases comprises withdrawing a fluid phase associated with a relatively lower specific gravity from the outer outlet of the outlet section.

14. The method of claim 11, wherein withdrawing separately the plurality of fluid phases comprises withdrawing a fluid phase associated with a relatively higher specific gravity from the inner outlet of the outlet section.

* * * * *